March 3, 1959 C. W. MILLER 2,876,395
PULSE ACTUATED LIGHT CONTROLLED SWITCHING MEANS
Filed Sept. 13, 1954
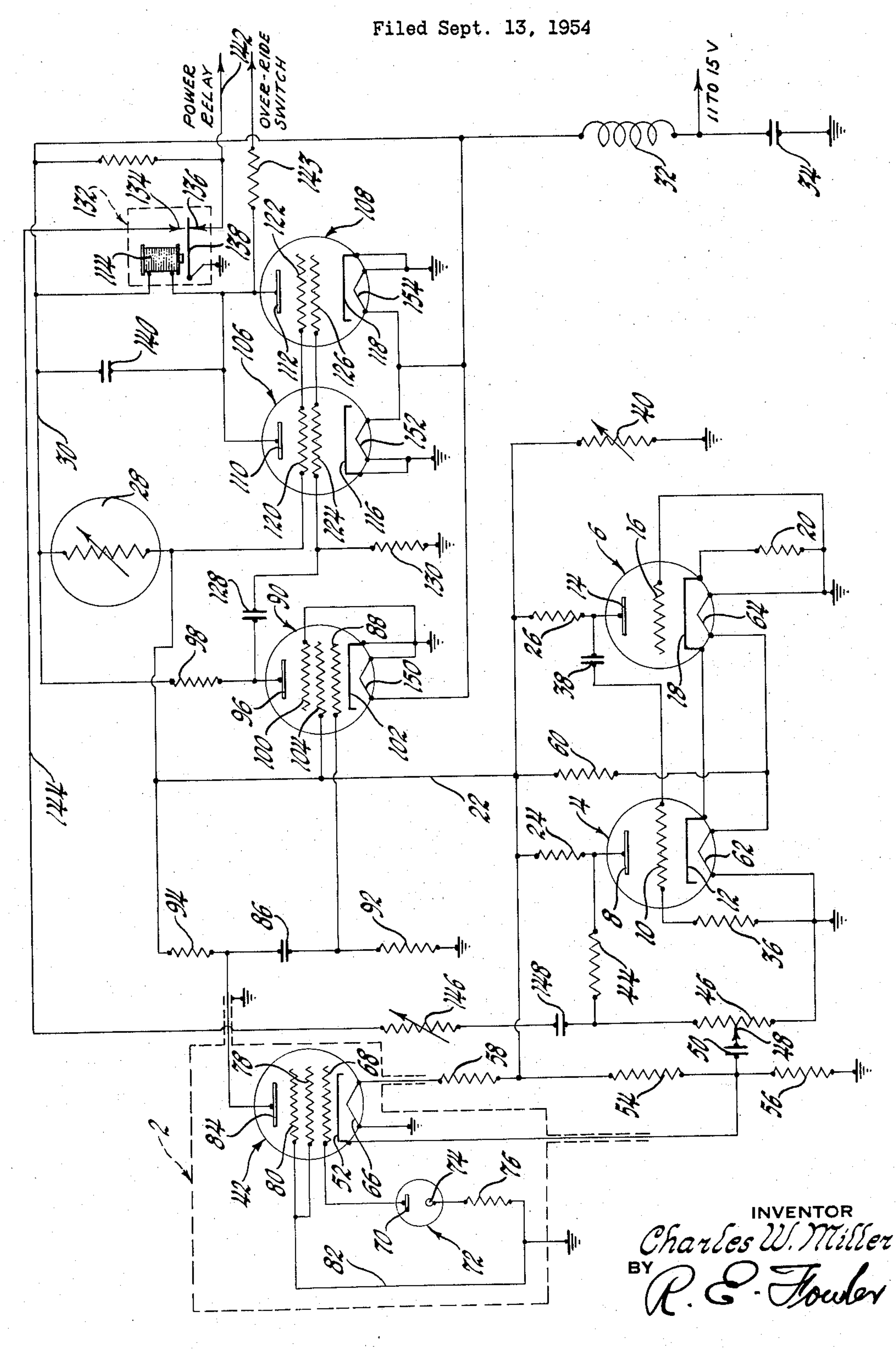
INVENTOR
Charles W. Miller
BY R. E. Fowler United States Patent Office 2,876,395

Patented Mar. 3, 1959

2,876,395

PULSE ACTUATED LIGHT CONTROLLED SWITCHING MEANS

Charles W. Miller, Anderson, Ind., assignor to General Motors Corporation, Detroit, Mich., a corporation of Delaware Application September 13, 1954, Serial No. 455,387

3 Claims. (Cl. 317—130)

This invention relates to light sensitive control means and more particularly to a light sensitive control system for controlling the energization of multiple filament headlamps for an automotive vehicle. Current automatic headlight switching means operated by light intensity consist of elements requiring much higher voltages than those ordinarily available on an automotive vehicle. In order to supply these voltages it is necessary to include in the apparatus power packs or interrupter and transformer combinations to provide the necessary voltages.

It is an object in making this invention to provide a light sensitive relay control switching means operable from the conventional battery voltage in a vehicle.

It is a further object in making this invention to provide a light sensitive control system utilizing a light sensitive means which controls the amplitude of pulses supplied in the control system for operation thereof.

With these and other objects in view which will become apparent as the specification proceeds, my invention will be best understood by reference to the following specification and claims and the illustrations in the accompanying drawing, in which:

The figure is a circuit diagram of a control system embodying my invention.

Referring now more particularly to the drawings, the control system consists of, in general, two units, the first of which is adapted to be mounted at some point in the vehicle where incident light from the front will fall thereon in order to actuate the system. This unit includes the light sensitive cell and may be mounted on the instrument panel, in front of the driver, or at any other desired location as long as oncoming headlamps may be concentrated on the light sensitive element thereof. This unit also includes a gating tube for controlling the amount of electrical energy to be applied to an amplifier section. The equipment thus far described is shown enclosed in the dotted rectangle 2. The remainder of the circuit consists in general of an oscillator, the output of which is fed to the gating tube to be controlled thereby, an amplifier section which is supplied with said regulated pulses, and an output stage which actuates a control relay for switching purposes. This equipment is ordinarily housed in a separate container and may be mounted at any desired position in the vehicle where space is available.

Referring now more particularly to the components, the oscillator consists of a multivibrator section including two tubes 4 and 6. Tube 4 has a plate 8, a control grid 10, and a cathode 12. The tube 6 likewise is provided with the same elements, which include a plate 14, a grid 16 and a cathode 18. All of these elements may, of course, be in a single tube if desired. The cathodes 12 and 18 are connected together and to ground through a biasing resistor 20. The plates 8 and 14 are connected to a regulated power supply line 22 through limiting resistors 24 and 26 respectively. The regulated power supply line 22 is connected through a voltage regulating ballast tube 28 to an unregulated power supply line 30.

This latter line is connected through an inductance 32 to the power supply, such as a conventional battery indicated by the arrow. It is also connected through condenser 34 to ground, the inductance 32 and condenser 34 acting as a filter.

The control grid 10 of the first tube 4 of the multivibrator is connected through biasing resistor 36 to ground and also through a condenser 38 to the plate 14 of the second tube 6. The control grid 16 of the second tube 6 is connected directly to ground. A variable resistance 40 is connected between the regulated power supply line 22 and ground to adjust the voltage thereof. This portion of the circuit is a relaxation oscillator of the cathode coupled multivibrator type and negative pulses from the plate 8 are adapted to be supplied to the cathode of the gating tube 42 in the pickup head 2. These oscillations are conveyed through the circuit hereinafter described. A resistance 44 is connected directly to the plate 8, and in series with a second resistance 46 to ground. A variable tap 48 on the resistance 46 is connected through a coupling condenser 50 to the cathode 52 of the tube 42 and also to a center tap between two series resistors 54 and 56. The opposite terminal of the resistor 54 is connected to the regulated power line 22 and the opposite terminal of the resistance 56 is grounded. Thus the negative pulse developed on plate 8 is fed through resistor 44 through a portion of the resistance 46, depending upon the position of the tap 48, and through the coupling condenser to the cathode 52. The filaments 62 and 64 respectively of the tubes 4 and 6 are supplied with power through dropping resistance 60 connected between the regulated power line 22, and one side of each of the filaments for these tubes. The opposite side is grounded. The filament 66 of the gating tube 42 is in like manner supplied with power from the regulated power line through dropping resistor 58.

The gating tube 42 has a control grid 68 which is connected directly to the cathode 70 of a light sensitive cell 72. The anode 74 for this cell 72 is connected to ground through a resistance 76. Both the screen grid 78 and the suppressor grid 80 are connected through line 82 to ground. The plate 84 of the gating tube 42 is connected through a coupling condenser 86 to the control grid 88 of the amplifier tube 90. The control grid 88 is also connected to ground through a biasing resistor 92. The plate 84 is likewise connected to the regulated power supply line 22 through a limiting resistor 94. The plate 96 of the amplifier tube 90 is connected to the unregulated power supply line 30 through limiting resistor 98. The suppressor grid 100 of the tube 90 is grounded as well as the cathode 102. The screen grid 104 of the tube 90 is connected directly to the regulated power supply line 22.

The power amplifier in the present instance consists of two electron tubes in parallel, namely 106 and 108, the plates 110 and 112 respectively being connected together and through a relay coil 114 to the unregulated power supply line 30. The cathodes 116 and 118 of the tubes are connected to ground. The screen grids 120 and 122 respectively are commonly connected to the regulated power supply line 22. The control grids 124 and 126 are likewise connected together and to the plate 96 of the amplifier tube 90 through coupling condenser 128. A biasing resistor 130 is connected between the control grids and ground.

The control relay 132, which includes the operating coil 114 previously referred to, also has two spaced stationary contacts 134 and 136. A movable armature 138 oscillates between these two stationary contacts and is grounded. It is biased to engage the lower contact 136 when the relay coil 114 is not energized, but is moved from engagement with that contact and into engagement with upper contact 134 when sufficient current flows through the operating coil 114. A filter condenser 140 is connected across the relay coil to smooth out the pulsating D. C. current supplied from plate 112. A conductive line 142 is connected to stationary contact 136 of the relay and extends to further control apparatus indicated as a power relay which in the case of automotive vehicles actually switches the headlamp filaments from high to low beam. A resistance 143 has one terminal connected to the plates 110 and 112 and the other to an overriding switch indicated by an arrow through which a manual override circuit may be completed. The upper contact 134 of the relay is connected through conductor 144 with one terminal of a variable resistance 146, the opposite terminal of which is connected through a coupling condenser 148 with a point intermediate the resistors 44 and 46. The filaments 150, 152 and 154 of the tubes 90, 106 and 108 respectively are fed with power from the unregulated power supply line 30 through an obvious circuit.

In providing automatic headlight control systems it is desired to cause the system to switch to one set of filaments at one intensity of incident light and to switch back to the other set of filaments at a different intensity of light. This is necessitated by the fact that when incident light falls on the photocell and causes the headlamps to be switched from high to low beam, very frequently the oncoming light will have its intensity reduced due to the fact that the approaching driver likewise dims his headlamps. Therefore the system must be more sensitive after it has switched to low beam that previously and must be capable of remaining on low beam with lower illumination. This is obtained in the current system by changing the sensitivity of the system through breaking the circuit between upper stationary contact 134 and armature 138 in going to low beam. It is also advisable to be able to adjust the sensitivity at either position for proper operation and to provide the proper range of sensitivities. This is accomplished in the present instance by adjustable resistor 146 which determines the sensitivity when the relay is energized and the lights are on high beam and the adjustment of tap 48 on resistor 46, which determines the sensitivity of the system when the lights are on low beam. These two adjustments may be referred to as the "dim" and "hold" adjustments respectively.

In the operation of the system the relaxation oscillator which is of the cathode coupled type produces a series of negative pulses on the plate 8 from conventional alternate conduction of the two electron streams through tubes 4 and 6. These negative pulses on plate 8 are applied through the resistance-capacitance coupling circuit to the cathode 52 of the gating tube 42. They will appear amplified at the plate as negative pulses and are then applied through coupling condenser 86 to control electrode 88 of the amplifier tube 90. However, conduction through the gating tube is controlled by the potential of the control grid 68 and there is provided in the control grid circuit the light sensitive tube 72, which, when no light is falling thereon, or a very small amount, maintains the control grid at such a negative potential that substantially no conductance occurs in the gating tube. This negative bias under no-light conditions is obtained by a free flow of electrons to the grid from the cathode. These electrons have no return path to the cathode until the gating tube becomes conductive and thus biases the grid negatively. As an illustration as much as two volts negative bias may be obtained in this manner.

The bias on the amplifier tube at this time, when no light falls on the cell, is sufficient to permit conduction therethrough, and that tube is conductive. At this point also, conductance occurs through the parallel paths provided by tubes 106 and 108 to energize relay coil 114 sufficiently to attract its armature 138 which is held in engagement with stationary contact 134 and out of engagement with stationary contact 136. This breaks a circuit to the power relay and that device is inactive and the vehicle lights are on high beam. At this time adjustable resistance 146 is included in circuit and affects the determination of the sensitivity of the amplifier.

When light falls on the photocell and it changes its resistance, the potential of the control grid 68 of tube 42 rises, permitting conduction through said tube 42 and providing on plate 84 a series of amplified negative pulses provided from the multivibrator. These are applied to the control grid 88 of the amplifier tube, which inverts or gives a phase difference of 180°, thus providing a series of further amplified positive pulses on the plate 96 of that tube. These positive pulses are in turn coupled to the control grids 124 and 126 of the tubes 106 and 108, driving them negative, due to the rectifying action of the cathode grid circuits of these tubes. When grid 68 of the gating tube has been driven sufficiently positive to provide large enough signals to cause cutoff to tubes 106 and 108, the relay coil 114 is deenergized, dropping its armature 138 and completing a circuit to the power relay to cause a switching of headlight beams. At the same time the circuit is broken with contact 134, which removes adjustable resistance 146 from the circuit, changing the sensitivity of the system and leaving only adjustable tap 48 to determine the sensitivity. When switch 134—138 is closed in upper beam position a circuit is completed from the top of resistor 46 through condenser 48, variable resistor 146, line 144, contact 134, armature 138 to ground. The position of adjustable arm 48 on resistance 46 determines the amplitude of the pulse from the oscillator which is applied to the gating tube 42. When switch 134—138 is closed to complete the above described circuit, a conductive path is provided for the pulse from the oscillator to ground through condenser 148 and resistance 146. This will reduce the amplitude of the pulse applied to the gating tube 42 to a certain extent. Under these conditions the sensitivity of the system is lower and more light will be required on the photo tube to produce a given output signal. The amount of the by-passed pulse is determined by the setting of resistance 146. When the switch 134—138 is opened the by-pass circuit is broken and a larger amplitude pulse applied to the gating tube to increase the sensitivity of the system. In the adjustment of the sensitivity of the set the tap 48 is adjusted to determine that point at which a minimum amount of light will allow the relay coil to attract its armature and switch to high beam, and then the adjustment of resistor 146 is made to determine that point in the increase in light at which the relay coil will drop its armature 138 and provide a switching to low beam.

I claim:

1. In a light sensitive control system, a source of electrical power, an oscillator connected thereto, an electron tube having a cathode, control grid and plate, adjustable coupling means connected between the oscillator and cathode to impress oscillations on said cathode, light sensitive means connected to the control grid to vary the bias thereon, relay switching means connected to the plate circuit of the tube to control desired apparatus and adjustable resistance means connected between the coupling means and the switching means and alternatively connected in circuit depending upon the position of the switching means to vary the sensitivity of the system between switch positions.

2. In a light sensitive control system, a source of regulated electrical power, a multivibrator connected thereto for producing an oscillatory voltage, an electron tube having a control grid, cathode and plate, conductive means coupling the output of the multivibrator to the cathode of the tube, said means including a variable resistance to regulate the voltage impressed on said cathode, a light sensitive cell connected to the grid of the tube to vary the bias on said grid in accordance with the amount of light falling on the cell, amplifying means connected to the plate of the tube, relay switching means connected in turn to the amplifier output and to means to be controlled so that varying sized pulses from the multivibrator are supplied to the amplifier dependent upon the amount of light falling on the cell to actuate the relay switching means, and variable resistance means connected between the coupling means and the relay switching means to be alternatively connected in circuit depending upon the position of the switching means to vary the sensitivity of the system at different switch positions.

3. In a light sensitive control system, a source of electrical power, an oscillator connected thereto for producing pulsating voltages, a first amplifier having an input and an output circuit, adjustable coupling means connecting said oscillator to said input circuit, a light sensitive cell also connected to said input circuit to control the flow through the amplifier, a second amplifier connected to the output circuit of the first, relay switching means connected to the second amplifier and controlled thereby and a variable resistance connected between the switching means and the coupling means to be alternately included in the circuit dependent upon the position of the switching means.

References Cited in the file of this patent

UNITED STATES PATENTS

| | | |
|---|---|---|
| 2,228,163 | Cohen | Jan. 7, 1941 |
| 2,590,826 | Schenck | Mar. 25, 1952 |
| 2,682,624 | Atkins | June 29, 1954 |
| 2,730,629 | Atkins | Jan. 10, 1956 |